(12) United States Patent
Tart

(10) Patent No.: US 12,189,461 B2
(45) Date of Patent: Jan. 7, 2025

(54) ENHANCED TRANSDUCER FAULT DETECTION

(71) Applicant: Baker Hughes Holdings LLC, Huston, TX (US)

(72) Inventor: Michael Alan Tart, Minden, NV (US)

(73) Assignee: Baker Hughes Holdings LLC, Houston, TX (US)

( * ) Notice: Subject to any disclaimer, the term of this patent is extended or adjusted under 35 U.S.C. 154(b) by 186 days.

(21) Appl. No.: 18/078,284

(22) Filed: Dec. 9, 2022

(65) Prior Publication Data

US 2024/0193027 A1   Jun. 13, 2024

(51) Int. Cl.
  *G06F 11/00* (2006.01)
  *G06F 11/07* (2006.01)

(52) U.S. Cl.
  CPC ........ *G06F 11/076* (2013.01); *G06F 11/0736* (2013.01)

(58) Field of Classification Search
  CPC .......................... G06F 11/076; G06F 11/0736
  USPC ...................................................... 714/1–57
  See application file for complete search history.

(56) References Cited

U.S. PATENT DOCUMENTS

| | | | |
|---|---|---|---|
| 7,289,923 B2* | 10/2007 | Marovitz | E03F 7/00 714/25 |
| 10,402,205 B2* | 9/2019 | Pan | G06F 11/27 |
| 2018/0024900 A1* | 1/2018 | Premerlani | G05B 23/0227 714/41 |
| 2021/0173757 A1* | 6/2021 | O'Donnell | B60H 1/00978 |

* cited by examiner

*Primary Examiner* — Sarai E Butler
(74) *Attorney, Agent, or Firm* — Mintz, Levin, Cohn, Ferris, Glovsky and Popeo, P.C. US

(57) ABSTRACT

A method for enhanced transducer fault detection including receiving data characterizing an electrical signal generated by a transducer, and determining that the received data is outside of a predetermined operational range of the transducer. The method can also include determining a period of time that the received data remains outside of the operational range, and comparing the period of time to a predetermined fault time delay. The method can also include determining that the period of time that the data remains outside of the operational range is greater than or equal to the predetermined fault time delay, and determining that the data is invalid, responsive to determining that the period of time is greater than or equal to the predetermined fault time delay. The method can also include determining a fault case from a plurality of fault cases based on the invalid received data, and providing the determined fault case.

20 Claims, 9 Drawing Sheets

| Transducer 910 | Type 920 | Operational Range (Volts) 930 | | Linear Range (Volts) 940 | | Bias Voltage Operational Range (Volts) 950 | |
|---|---|---|---|---|---|---|---|
| | | Lower | Upper | Lower | Upper | Lower | Upper |
| 3300XL-8mm | Proximity | -0.5 | -21 | -1 | -17 | n/a | n/a |
| 3300XL-25mm | Proximity | -0.8 | -18 | -1.5 | -11.5 | n/a | n/a |
| 7200-14mm | Proximity | -1 | -22 | -3.6 | -19.6 | n/a | n/a |
| 23733 | Acceleration | -2 | -17 | -2.75 | -15.05 | -8 | -9 |
| 24145 | Acceleration | -2 | -20 | -2.75 | -15.05 | -8 | -9 |
| 330400 | Acceleration | -1 | -20 | -2.75 | -15.05 | -8 | -9 |
| 330525 | Velocity | -2 | -23 | -4.15 | -19.85 | -9 | -15 |
| 330505 | Velocity | -2 | -20 | -4.15 | -19.85 | -11 | -13 |

FIG. 9

ENHANCED TRANSDUCER FAULT DETECTION

BACKGROUND

The present disclosure pertains to the field of monitoring transducer status within industrial equipment. Specifically the present disclosure pertains to enhanced transducer fault checking and systems and methods for determining a fault status of a transducer, as well as for determining and providing indications of potential sources of faults in transducer systems. Transducer fault detection can also be referred to as transducer "OK" detection.

Transducers are devices that convert energy from one form to another, and are often used to monitor the operation of various industrial assets. When monitoring the operation of assets, transducers can be configured to convert physical quantities, like position, motion, force, pressure, light, torque, etc. into electrical signals like voltage and current which can then be processed by a computer in order to obtain information about the operation of the asset.

Transducer status monitoring, or transducer fault checking refers to the process of comparing a signal output from a transducer to a predetermined range of signals constituting an operational range of the transducer, set by the manufacturer. Traditionally, if the signal is within the linear operational range, it can be determined that there are no faults detected in the operation of the transducer, or that the transducer is "OK". In this range, the transducer is providing reliable information about the operation of the asset. However, if the signal is outside of the linear operational range, it can be determined there may be a fault in the transducer, or that the transducer is "Not OK". In this range, the transducer is not providing reliable information about the operation of the asset.

Transducer fault checking is performed in many industrial systems that utilize transducers in order to more accurately monitor the operation of an asset that the transducer is monitoring. Common transducer types used in many industrial systems include proximitors, accelerometers, and velomitors.

Additionally, some transducer fault detection systems can have a set point, set by an operator, within the operational range. The set point can represent a maximum desirable value of the data characterizing an electrical signal. For example, set point can represent a level of vibration, within the operational range, that the operator would like to operate below. Transducer fault detection system can be configured to alarm an operator if the data characterizing an electrical signal rises above the set point for but remains within the operational range.

SUMMARY

In one aspect, a method for enhanced transducer fault detection is provided. In an embodiment, the method can include receiving, by at least one data processor of a computing system communicatively coupled to a transducer, data characterizing an electrical signal generated by the transducer. The method can further include determining that the received data is outside of a predetermined operational range of the transducer, the operational range having a lower limit and an upper limit. The method can further include determining a period of time the received data remains outside of the operational range and comparing the period of time to a predetermined fault time delay. The method can further include determining that the period of time the received data remains outside of the operational range is greater than or equal to the predetermined fault time delay, and determining that the received data is invalid responsive to determining that the period of time is greater than or equal to the predetermined fault time delay. The method can further include determining a fault case from a plurality of fault cases based on the invalid received data, and providing the determined fault case.

In another embodiment, the method can further include determining that the received data has returned within the operational range of the transducer. The method can also include determining a period of time the received data remains inside of the operational range to compare to a predetermined settling time. The method can also include determining that the period of time the received data remains inside of the operational range is greater than or equal to the predetermined settling time, and determining that the received data is valid.

In another embodiment, the received data can be a voltage ranging from 0 V to a non-zero supply voltage supplied to the transducer, and the operational range can further include a non-linear range and a linear range within the non-linear range.

In another embodiment, the transducer can be a radial proximitor, and the plurality of fault cases can include a first wiring fault case, a transducer fault case, an out of range fault case, and a second wiring fault case. In this embodiment, the determining of a fault case from a plurality of fault cases can further include assigning the first wiring fault case responsive to a voltage between 0 V and −0.25 V. The method can further include assigning the transducer fault case responsive to a voltage between −0.25 V and the lower limit of the operational range. The method can further include assigning the out of range fault case responsive to a voltage between the upper limit of the operational range and the non-zero supply voltage+0.25 V. The method can further include assigning the second wiring fault case responsive to a voltage between the non-zero supply voltage+0.25 V and the non-zero supply voltage.

In another embodiment, the lower limit of the operational range can be between −0.5 V and −1 V, the upper limit can be between −18 V and −22 V, and the non-zero supply voltage can be −23.5 V.

In another embodiment, the transducer can be a thrust proximitor, and the plurality of fault cases can include a first wiring fault case, a transducer fault case, an out of range fault case, and a second wiring fault case. In this embodiment, the determining of a fault case from a plurality of fault cases can further include assigning the first wiring fault case responsive to a voltage between 0 V and −0.25 V. The method can further include assigning the transducer fault case responsive to a voltage between −0.25 V and the lower limit of the operational range. In this embodiment, assigning the transducer fault case can further include a step of alarming. The method can further include assigning the out of range fault case responsive to a voltage between the upper limit of the operational range and the non-zero supply voltage+0.25 V. In this embodiment, assigning the out of range fault case can further include a step of alarming. The method can further include assigning the second wiring fault case responsive to a voltage between the non-zero supply voltage+0.25 V and the non-zero supply voltage.

In another embodiment, the lower limit of the operational range can be between −0.5 V and −1 V, the upper limit can be between −18 V and −22 V, and the non-zero supply voltage can be −23.5 V.

In another embodiment, the received data can be a voltage ranging from 0 V to a non-zero supply voltage supplied to the transducer, the voltage further including a direct current (DC) bias voltage portion and an alternating current (AC) voltage portion. In this embodiment, the transducer can further include a DC bias voltage operational range, including a lower limit and an upper limit.

In another embodiment, the transducer can be an accelerometer and the plurality of fault cases can include a first wiring fault case, a first transducer fault case, and a second wiring fault case. In this embodiment, the determining of a fault case from a plurality of fault cases can further include assigning the first wiring fault case responsive to a voltage between 0 V and −0.25 V. The method can also include assigning the first transducer fault case responsive to a voltage between −0.25 V and the lower limit of the operational range, or responsive to a voltage between the upper limit of the operational range and the non-zero supply voltage+0.25 V. The method can also include assigning the second wiring fault case responsive to a voltage between the non-zero supply voltage and the non-zero supply voltage+0.25 V.

In another embodiment, the plurality of fault cases can further include a second transducer fault case, and a reversed wiring case. In this embodiment, the determining of a fault case from a plurality of fault cases can further include filtering the data received through a filter configured to separate the DC bias voltage portion from the AC voltage portion. The method can also include assigning the first wiring fault case responsive to a DC bias voltage between 0 V and −0.25 V; assigning second transducer fault case responsive to a DC bias voltage between −0.25 V and the value derived from adding the lower limit of the DC bias voltage operational range to the absolute value of the DC bias voltage operational range, or responsive to a DC bias voltage between the upper limit of the DC bias voltage operational range and the value derived from adding 0.25 V to the non-zero supply voltage. In this embodiment, assigning the transducer fault case can further include alarming. The method can also include assigning the reversed wiring case responsive to a DC bias voltage between the value derived from adding the lower limit of the DC bias voltage operational range to the absolute value of the DC bias voltage operational range and the lower limit of the DC bias voltage operational range. The method can also include assigning the second wiring fault case responsive to a DC bias voltage between the value derived from adding 0.25 V to the non-zero supply voltage and the non-zero supply voltage.

In another embodiment, the transducer can be monitoring an operating machine, and the method can further include turning off the power to the machine responsive assigning the first fault case and/or the second fault case.

In another embodiment, the lower limit of the operational range can be between −1 V and −2 V, the upper limit can be between −17 V and −20 V, the lower limit of the DC bias voltage range can be −8 V, the upper limit of the DC bias voltage range can be −9 V, and the non-zero supply voltage can be −23.5 V.

In another embodiment, the transducer can be a velomitor or an accelerometer coupled to an integrator configured to integrate the data received. In this embodiment, the plurality of fault cases can include a wiring fault case, and a first transducer fault case. In this embodiment, determining a fault case from a plurality of fault cases can further include assigning the wiring fault case responsive to a voltage between 0 V and −0.25 V. The method can also include assigning the first transducer fault case responsive to a voltage between −0.25 V and the lower limit of the operational range, or responsive to a voltage between the upper limit of the operational range and the non-zero supply voltage.

In another embodiment, the plurality of fault cases can further include a second transducer fault case, and a reversed wiring case. In this embodiment, determining of a fault case from a plurality of fault cases can further include filtering the data received through a filter configured to separate the DC bias voltage portion from the AC voltage portion. The method can also include assigning the first wiring fault case responsive to a DC bias voltage between 0 V and −0.25 V. The method can further include assigning second transducer fault case responsive to a DC bias voltage between −0.25 V and the value derived from adding the lower limit of the DC bias voltage operational range to the absolute value of the DC bias voltage operational range, or responsive to a DC bias voltage between the upper limit of the DC bias voltage operational range and the non-zero supply voltage. In this embodiment, assigning the transducer fault case can further include alarming. The method can also include assigning the reversed wiring case responsive to a DC bias voltage between the value derived from adding the lower limit of the DC bias voltage operational range to the absolute value of the DC bias voltage operational range and the lower limit of the DC bias voltage operational range.

In another embodiment, the lower limit of the operational range can be −2 V, the upper limit can be between −20 V and −23 V, the lower limit of the DC bias voltage range can be between −9 V and −11 V, the upper limit of the DC bias voltage range can be between −13 V and −15 V, and the non-zero supply voltage can be −23.5 V.

In another embodiment, the predetermined fault time delay can be 300 psec.

In another embodiment, the providing can be done via a multi-colored LED, a user interface display, and/or an auditory notification coupled to the computing device. In another embodiment, the providing can further include providing the user with the list of possible faults corresponding to the fault case assigned.

In another aspect, a transducer fault detection system is provided. In one embodiment, the transducer fault detection system can include a transducer configured to acquire physical data from an asset and convert the physical data into data characterizing an electrical signal in the form of a voltage. The system can also include a computing system including at least one data processor communicatively coupled to the transducer. In one embodiment, the at least one data processor can be configured to receive data characterizing an electrical signal generated by the transducer. The at least one processor can also be configured to determine that the received data is outside of a predetermined operational range of the transducer, the operational range having a lower limit and an upper limit. The at least one processor can also be configured to determine a period of time the received data remains outside of the operational range to compare to a predetermined fault time. The at least one processor can also be configured to determine that the period of time the received data remains outside of the operational range is greater than or equal to the predetermined fault time. The at least one processor can further be configured to determine that the received data is invalid, and determine a fault case from a plurality of fault cases based on the received data. The at least one processor can also be configured to provide the fault case determined.

In another embodiment, the physical data can be vibrational data of an operating asset, and the transducer can be chosen from any one of a radial proximitor, a thrust proximitor, an accelerometer, and a velomitor. In this embodiment, the voltage can range from 0 V to a non-zero supply voltage supplied to the transducer. In this embodiment, the voltage can further include a direct current (DC) bias voltage portion and an alternating current (AC) voltage portion. In this embodiment, the system can further include a low-pass filter, coupled to the computing system, and configured to separate the DC bias voltage portion from the AC voltage portion.

DESCRIPTION OF DRAWINGS

These and other features will be more readily understood from the following detailed description taken in conjunction with the accompanying drawings, in which:

FIG. 9 illustrates a table of exemplary transducers, transducer types, operational ranges, linear ranges within the operational ranges, and bias voltage operational ranges described herein;

Figure 1:
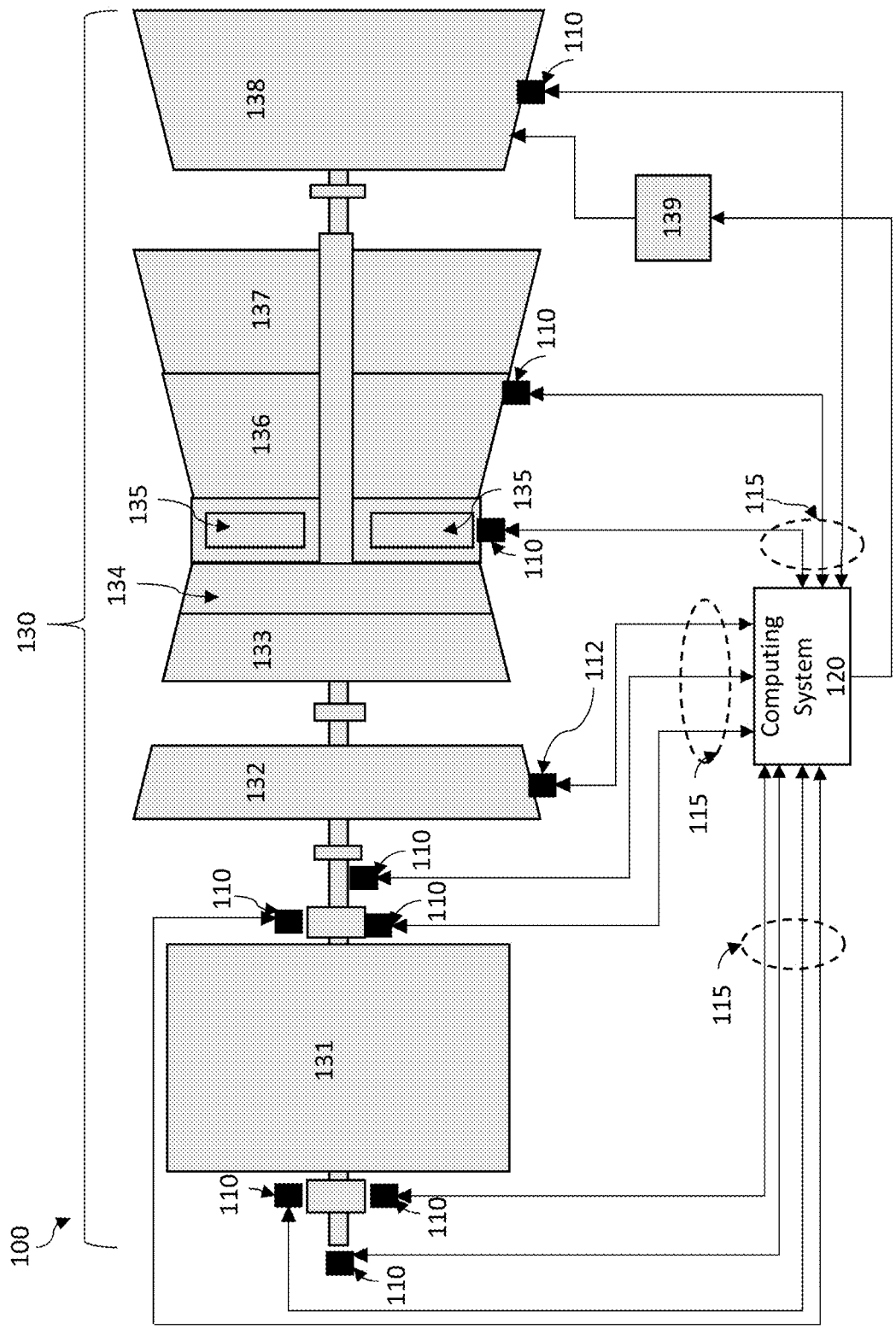
FIG. 1 illustrates an example of a transducer fault detection system described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

In traditional transducer fault detection systems, fault detection is done by comparing a signal output from a transducer to an operational range of signals constituting an operational range of the transducer, set by the manufacturer. Traditionally, the operational range is marked by a lower limit and an upper limit. The operational range can be optimized by the manufacturer for each transducer in order to provide a linear output range that can be easily interpreted by a processor. In the traditional method, if the signal is within the linear operational range, it can be determined that the transducer is "OK", meaning that the transducer is providing reliable information about the operation of the asset. Alternatively, if the signal is outside of the linear operational range, it can be determined that the transducer is "Not OK", meaning that it is not providing reliable information about the operation of the asset. There can also exist a non-linear operational range outside of the linear operational range, where the data output characterizing an electrical signal my not be linear, but it can be classified as "OK" in terms of fault detection. Traditional transducer fault detection systems do not make use of this non-linear operational range.

Traditionally, when an operator receives a fault or "Not OK" indication from a traditional transducer fault detection system, they are not provided with a detailed analysis of the transducer fault. With a lack of detailed analysis, the user is unable to easily identify if the fault indication is a result of a legitimate problem with the transducer, a problem in the wiring of the transducer, a problem in the connection of the transducer to a power source, simply a symptom of noise in the signal, or another issue. For example, noise on a signal in traditional transducer fault detection systems can cause the output to temporarily go outside of the operational range. Traditionally, this temporary jump can indicate a false fault of the transducer. Accordingly, it would be optimal if a transducer fault detection system were able to ignore the noise and continue to function. Overall, not providing an adequate diagnosis of a transducer fault indication can result in time intensive manual diagnosis leading to further operational inefficiencies.

The system and methods described herein address the aforementioned shortcomings. For example, one or more embodiments of the present disclosure can include a transducer fault detection system capable of detecting and diagnosing a fault from a plurality of faults that can occur in a transducer having an operational range. In some embodiments, the operational range can include a non-linear operational range, and a linear operational range within the non-linear operational range.

The transducer fault detection system described herein can include a transducer which can be manufactured with a predetermined operational range. The transducer fault checking system can further include a computing device that can include at least one data processor that can determine if the data characterizing an electrical signal is outside of the predetermined operational range. Upon making a determination that the data characterizing an electrical signal is outside of the predetermined operational range, the data processor can time the duration that the data characterizing an electrical signal remains outside of the predetermined operational range and compare the time to a predetermined fault time delay. Upon determining that the period of time the data characterizing an electrical signal has remained outside of the operational range is greater than or equal to the predetermined fault time delay, the data processor can mark the data characterizing an electrical signal as invalid. The predetermined fault time delay can prevent the transducer fault checking system described herein from indicating a fault in the operation based off of noise in the data characterizing an electrical signal. The transducer fault checking system can further determine a fault case from a plurality of fault cases based on the data characterizing an electrical signal and provide the fault case to a user.

By determining a fault case to the transducer system, based on the data characterizing an electrical signal, the system and methods described herein can further provide a detailed analysis of a transducer fault indication by categorizing into a specific fault case and providing an operator with a list of possible faults organized based on probability. Providing an operator with the aforementioned detailed analysis of a transducer fault indication can inform the operator and mitigate operational inefficiencies associated with manual diagnosis of fault indications. Further, the transducer fault detection system described herein allows an asset in which a transducer is provided to continue to operate when the transducer is outside of its operational range, mitigating unnecessary asset trips and operational downtime.

FIG. 1 illustrates an example of a transducer fault detection system 100 described herein. The transducer fault detection system 100 can be include one or more transducers 110 configured to monitor asset 130. In some embodiments, the transducers 110 can be supplied with a non-zero supply voltage from a power source. In some embodiments, the power source of the transducers 110 can be a computing system 120 communicatively coupled to the transducers 110. In some embodiments, asset 130 can be, for example, a turbine generator set. The generator set 130 can further include, for example, a generator 131, low pressure turbine 132, an intermediate pressure turbine 133, a high pressure turbine 134, a plurality of combustors 135, a high pressure cylinder 136, an intermediate pressure cylinder 137, and a liquid propane compressor 138. In some embodiments, the asset 130 can be powered by an asset power supply 139. In some embodiments, the asset power supply 139 can be, for example, a dual 24 V DC power supply. In some embodiments, the transducers 110 can be configured to receive physical data from the asset 130. The transducers 110 can be configured to convert the physical data from the asset 130 into data characterizing an electrical signal 115. In some embodiments, the data characterizing an electrical signal 115 can be a voltage. In some embodiments, the transducers 110 can include a one or more probes 112 coupled to the asset 130. The transducer fault detection system 100 can be configured to send the data characterizing the electrical signals 115 to a computing system 120 communicatively coupled to the transducers 110 for processing. In some embodiments, the computing system 120 can further be communicatively coupled to the asset power supply 139. In some embodiments, the computing system 120 can be configured to turn of the power supply 139 responsive to the transducer fault detection system 100 detecting a transducer fault. In some embodiments one or more of the transducers 110 can be coupled to or mounted directly to the asset 130. In some embodiments, the transducers 110 can include a proximitor, an accelerometer, a velomitor, and/or a keyphasor. In some embodiments, a proximitor may be used to monitor radial vibration. In some embodiments, a proximitor may be used to monitor thrust vibration. In some embodiments, the transducers 110 can include a micro-electro-mechanical system (MEMS) capacitive accelerometer, a hall-effect accelerometer, a piezoelectric accelerometer, a piezo-resistive accelerometer, or the like. In some embodiments, a velomitor may be an accelerometer coupled to an integrator.

Figure 2:
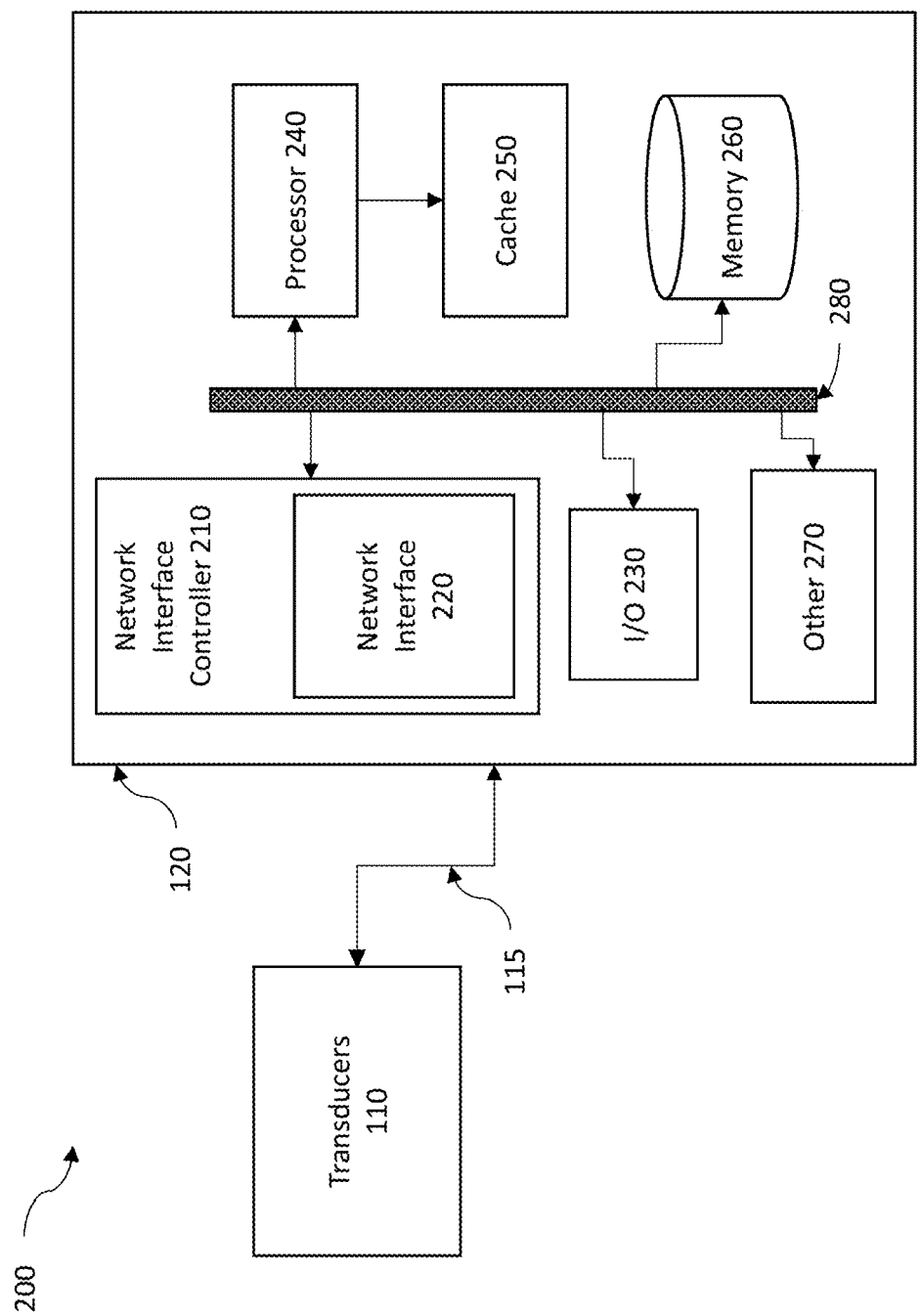
FIG. 2 is a block diagram of an example architecture of a computing system or device described herein.

FIG. 2 is a block diagram of an example architecture 200 of a computing system or device, such as the computing system 120 configured to receive data from one or more transducers 110. In broad overview, the computing system 120 can include at least one processor 240 for performing actions in accordance with instructions, and one or more memory devices 250 and/or 260 for storing instructions and data. The illustrated example computing system 120 includes one or more processors 240 in communication, via a bus 280, with memory 260 and with at least one network interface controller 210 with a network interface 220 for connecting to the transducers 110. The one or more processors 240 are also in communication, via the bus 280, with each other and with the plurality of transducers 110, and any other devices 270. The processor 240 illustrated incorporates, or is directly connected to, cache memory 250. Generally, a processor will execute instructions received from memory. In some embodiments, the computing system 120 can be configured within a cloud computing environment, a virtual or containerized computing environment, and/or a web-based microservices environment.

In more detail, the processor 240 can be any logic circuitry that processes instructions, e.g., instructions fetched from the memory 260 or cache 250. In many embodiments, the processor 240 is an embedded processor, a microprocessor unit or special purpose processor. The computing system 120 can be based on any processor, e.g., suitable digital signal processor (DSP), or set of processors, capable of operating as described herein. In some embodiments, the processor 240 can be a single core or multi-core processor. In some embodiments, the processor 240 can be composed of multiple processors.

The memory 260 can be any device suitable for storing computer readable data. The memory 260 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 120 can have any number of memory devices 260.

The cache memory 250 is generally a form of high-speed computer memory placed in close proximity to the processor 240 for fast read/write times. In some implementations, the cache memory 250 is part of, or on the same chip as, the processor 240.

The network interface controller 210 manages data exchanges via the network interface 220. The network interface controller 210 handles the physical, media access control, and data link layers of the Open Systems Interconnect (OSI) model for network communication. In some implementations, some of the network interface controller's tasks are handled by the processor 240. In some implementations, the network interface controller 210 is part of the processor 240. In some implementations, a computing device 120 has multiple network interface controllers 210. In some implementations, the network interface 220 is a connection point for a physical network link, e.g., an RJ 45 connector. In some implementations, the network interface controller 210 supports wireless network connections via network interface port 220. Generally, a computing device 120 exchanges data with the transducers 110, via physical or wireless links to a network interface 220. In some implementations, the network interface controller 210 implements a network protocol such as LTE, TCP/IP Ethernet, IEEE 802.11, IEEE 802.16, or the like.

The transducers 110 can be connected to the computing device 120 via a network interface port 220. The other devices 270 can include an I/O interface 230, external serial device ports, and any additional co-processors. For example, a computing system 120 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 120, e.g., a touch screen on a tablet device. In some implementations, a computing device 120 includes an additional device 270 such as a co-processor, e.g., a math co-processor that can assist the processor 240 with high precision or complex calculations.

Figure 3:
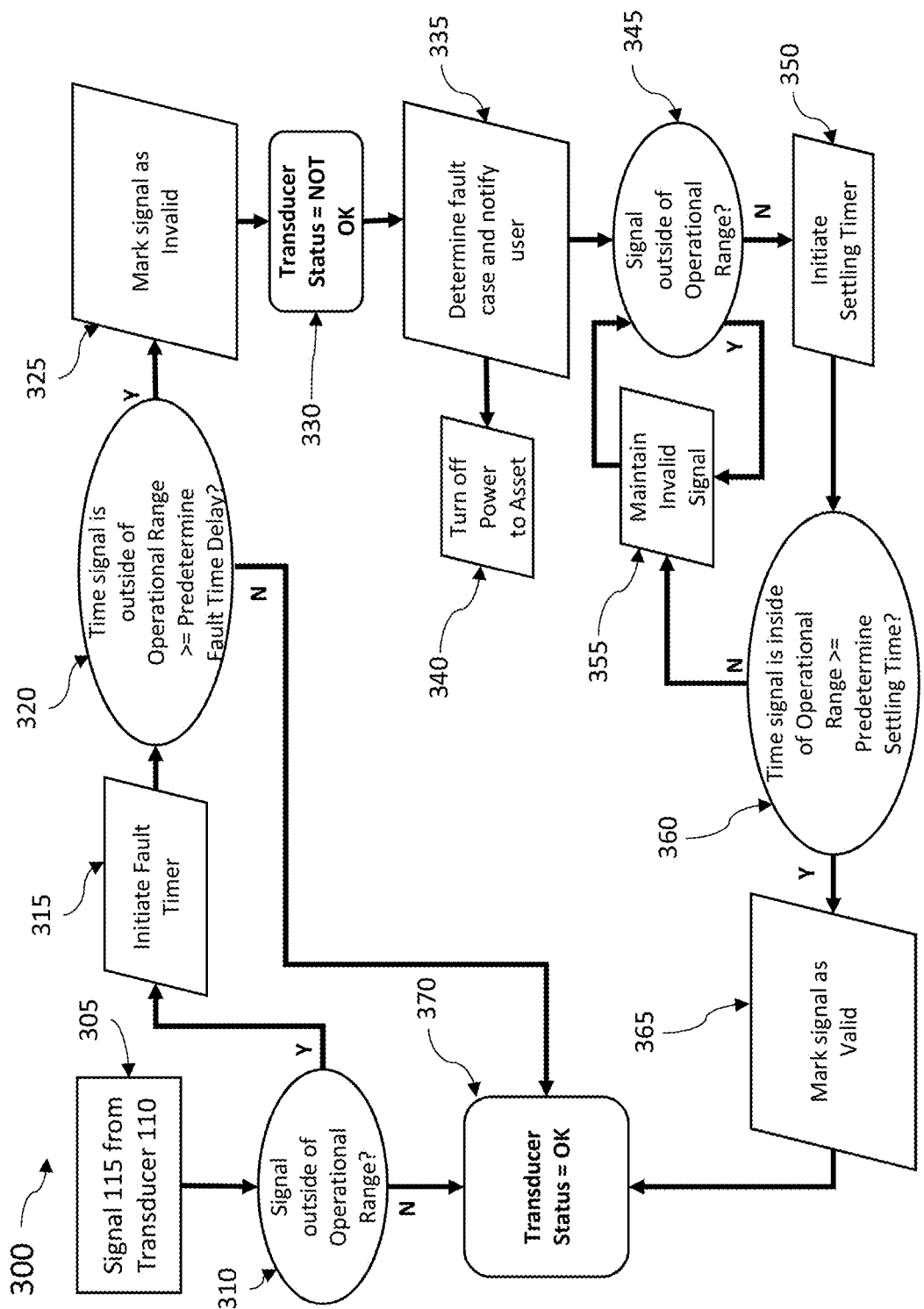
FIG. 3 is an example of a method of transducer fault detection according to one embodiment.

FIG. 3 is an example method diagram of a method 300 of transducer fault detection according to one embodiment of the present disclosure. The computing system 120 can include a memory 260 storing non-transitory, computer-readable and executable instructions, which when executed by the data processor 240 cause the data processor 240 to perform one or more operations of the method 300. At 305, signals 115 from one or more transducers 110 can be received by the computing system 120. At step 310, the computing system 120 can determine if the data characterizing the electrical signal 115 is outside of an operational range of the transducer. In some embodiments, the data received at 305 may have already triggered a set point alarm of the asset 130 being monitored due to the data exceeding a set point for desired operation of the asset 130. In some embodiments, the set point can be set by an operator. Upon determining that the data characterizing an electrical signal is not outside of the operational range, the method 300 can further include step 370 of determining that the transducer is functioning properly (the transducer has a status of "OK"). In some embodiments, a transducer having an "OK" status can result in no notification to an operator. In other embodiments, a transducer having an "OK" status can result in a notification to an operator. Examples of a notification for an "OK" status can include an LED indication or an indication on a user interface display coupled to the computing device. Alternatively, upon determining that the data characterizing an electrical signal is outside of the operational range, the method 300 can further include a step 315 of initiating a fault timer. In some embodiments, the fault timer can be configured to time a duration that the data characterizing an electrical signal remains outside of the operational range. In some embodiments, the fault timer can be initiated by the data processor of the computing device.

Transducer fault detection systems can be configured to have a set point, which marks a maximum desirable output for a transducer during operation. The set point can be set within the linear operational range of the transducer. Such transducer fault detection systems can be configured to track the outputs from the transducer using, for example, a peak-to-peak detector. The transducer fault detection system can be configured to initiate a set point pre-alarm in the case where the output from the transducer is above the set point. In some cases, the pre-alarm can be configured to run for a predetermined time, while the output remains above the set point, before triggering a set point alarm. Accordingly, the pre-alarm can be configured to reduce the occurrences of the set point alarm being triggered due to noise in the output. Further, transducers can often generate elevated voltage outputs when subjected to impacts that exceed both a set point of the transducer as well as the operational range of the transducer. When these spikes occur, they may not represent a fault in the system, but rather, they may simply represent temporary noise in the output. In this case, it can be optimal to have a transducer fault detection system continue to operate without indicating that there has been a fault in the system. Additionally, in this case, if a set point pre-alarm and/or set point alarm had previously been triggered by a transducer fault detection system, it can be desirable to maintain the set point alarm. On the contrary, however, in a case where the output remains outside of the operational range, it can be likely that there is a fault in the system, rather than the system operating above its set point. In this case, it can be preferable to stop the set point pre-alarm, or the set point alarm, and instead indicate that there has been a fault in the system.

Accordingly, method 300 can further include a step 320 of comparing the time that the data characterizing an electrical signal remains outside of operational range to a predetermined fault time delay. Accordingly, the predetermined fault time delay can be optimized to detect a fault fast enough for the transducer fault detection system to not trigger a set point alarm, but slow enough to not indicate a fault on the basis of noise in the system. The predetermined fault time delay can be determined based on the transducer type and noise levels in the transducer fault detection system, among other variables. In some embodiments, the predetermined fault time delay can be between 10–500 psec.

Upon determining that the data characterizing an electrical signal is outside of operational range for a time less than the predetermine fault time delay, the method 300 can further include the step 370 of determining that the transducer is functioning properly (the transducer has a status of "OK"). Alternatively, upon determining that the data characterizing an electrical signal is outside of operational range for a time greater than or equal to the predetermine fault time delay, the method 300 can further include a step 325 of marking the signal as invalid.

In some embodiments, method 300 can further include a step 330 of determining that there is a fault in the system and changing the status of the transducer to "Not OK". In some embodiments, method 300 can further include step 335 of determining a fault case from a plurality of fault cases and notifying a user of the determined fault case. In some embodiments the data characterizing a signal can be a voltage ranging from 0 volts to a non-zero supply voltage supplied to the transducer. In some embodiments, each fault case of the plurality of fault cases can correspond to a voltage range (or a plurality of voltage ranges) in between 0 V and the non-zero supply voltage supplied to the transducer. In some embodiments, the plurality of fault cases can be stored in a memory of the computing system (i.e. memory 260 of FIG. 2). In some embodiments, step 335 can further include initiating a "Not OK" alarm responsive to the determined fault case. In some embodiments where a set point pre-alarm and/or set point alarm had previously been triggered, step 335 can further include stopping the set point pre-alarm and/or set point alarm. In some embodiments, method 300 can include an optional step 340 of turning off the power to an asset being monitored by the transducer fault detection system responsive to the determined fault case.

In some embodiments, method 300 can further include a step 345 of determining if the data characterizing an electrical signal from a transducer is outside of an operational range of the transducer. Upon determining that the data characterizing an electrical signal is outside of the operational range, the method 300 can further include a step 355 of maintaining the data characterizing the signal as invalid and repeating step 345. Alternatively, upon determining that the data characterizing an electrical signal is not outside of the operational range, the method 300 can further include a step 350 of initiating a settling timer. In some embodiments, the settling timer can be configured to run for a predetermined settling time set by the manufacturer, or the operator. In some embodiments, the settling timer can be initiated by the data processor of the computing device.

In some embodiments, method 300 can further include a step 360 of comparing the time that the data characterizing an electrical signal is within the operational range to a predetermined settling time. Upon determining that the time that the data characterizing an electrical signal is within the operational range is less than the predetermined settling time, the method 300 can further include jumping to step 355 of maintaining the data characterizing the signal as invalid and repeating step 345. Alternatively, upon determining that time the data characterizing an electrical signal is within the operational range is greater than or equal to the predetermined settling time, method 300 can include a step 365 of marking the signal as valid. Upon marking the signal as valid, method 300 can include the step 370 of determining that the transducer is functioning properly (the transducer has a status of "OK").

Figure 4:
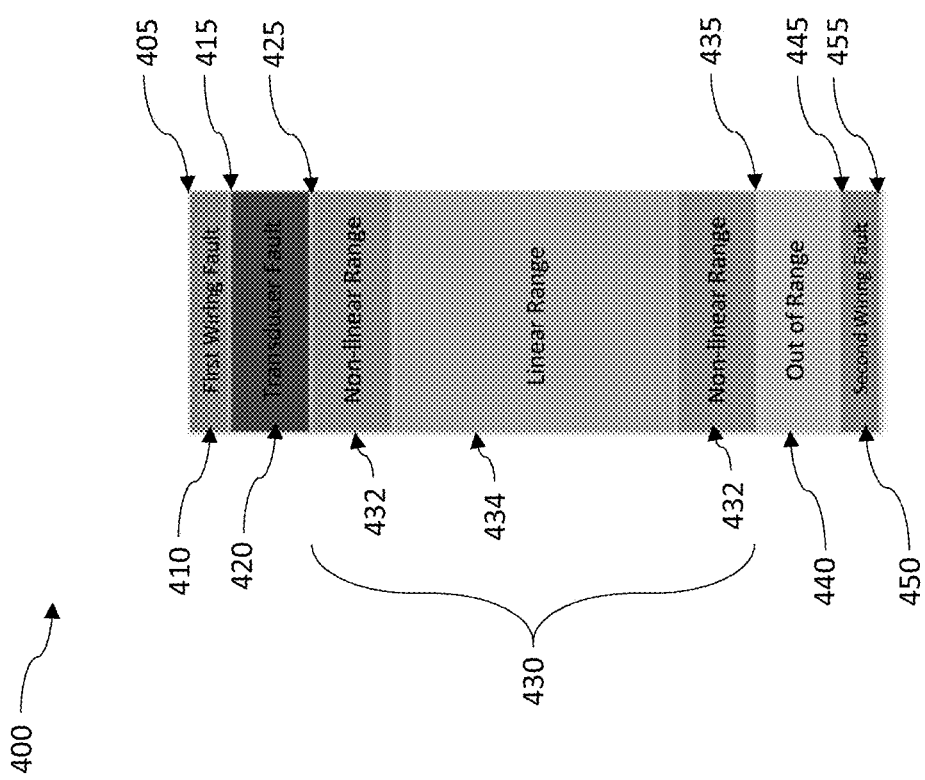
FIG. 4 illustrates an exemplary voltage range for data characterizing an electrical signal that is output from a transducer into at least one data processor of a computing system of a transducer fault detection system for determining a fault case described herein.

FIG. 4 illustrates an exemplary voltage range 400 representing a voltage range for data characterizing an electrical signal that is output from a transducer into at least one data processor of a computing system of a transducer fault detection system. The voltage range 400 can span from a zero point 405 to a non-zero supply voltage value 455 supplied to the transducer. In some embodiments, the zero point 405 can be 0 Volts (V), and the non-zero supply voltage value 455 can be −23.5 V. In some embodiments, the voltage range 400 can represent a plurality fault cases voltage ranges, and an operational range for a proximitor. In some embodiments, the proximitor represented by voltage range 400 can be used in a radial sensing operation. In other embodiments, the proximitor represented by voltage range 400 can be used in a thrust sensing operation. In some embodiments, the plurality of fault case ranges can include a first wiring fault case range 410, a transducer fault case range 420, an out of range case range 440 and a second wiring fault case range 450. In some embodiments, the operational range 430 can include a non-linear range 432, and a linear range 434 within the non-linear range 434.

In reference to voltage range 400, data characterizing an electrical signal that falls in the first wiring fault case range 410 can indicate that the transducer is operating outside of its operational range 430 due to a wiring fault. Upon a determination by the at least one data processor that the data characterizing an electrical signal is in the first wiring fault case range 410, the data processor can be configured to provide a list of possible fault diagnoses. In some embodiments, the list of possible fault diagnoses can include a diagnosis that the signal line is shorted to common, a diagnosis that the signal line is disconnected, a diagnosis that the transducer power is not connected to the proximitor, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor.

In reference to voltage range 400, data characterizing an electrical signal that falls in the transducer fault case range 420 can indicate that the transducer is operating outside of its operational range 430 due to a fault in the transducer. Upon a determination by the at least one data processor that the data characterizing an electrical signal is in the transducer fault case range 420, the data processor can be configured to provide a list of possible fault diagnoses. In some embodiments, the list of possible fault diagnoses can include a diagnosis that there is a fault with the proximitor, a diagnosis that there is a fault with a probe connected to the proximitor, a diagnosis that there is a fault with the conncetion (i.e. cable) between the proximitor and the probe, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor. In some embodiments, for example, when the proximitor is being used in a thrust sensing operation, upon a determination that the data characterizing an electrical signal is in the transducer fault case range 420, the data processor can be configured to initiate a "Not OK" alarm of the transducer fault detection system. In some embodiments, the "Not OK" alarm can be integral with a set point alarm of the system.

In reference to voltage range 400, data characterizing an electrical signal that falls in the out of range case range 440 can indicate that the transducer is operating outside of its operational range 430 due to the sensing target being physically out of the transducer probe's sensing range. Upon a determination by the at least one data processor that the data characterizing an electrical signal is in the out of range case range 440, the data processor can be configured to provide a list of possible fault diagnoses to an operator. In some embodiments, the list of possible fault diagnoses can include a diagnosis that the target is out of range of the transducer's sensing probe. In some embodiments, the list can be provided in a hierarchal list based on probability of occurrence. In some embodiments, the list can be provided to a user interface of a general user interface display communicatively coupled to the at least one data processor. In some embodiments, for example, when the proximitor is being used in a thrust sensing operation, upon a determination that the data characterizing an electrical signal is in the out of range fault case range 440, the data processor can be configured to initiate a "Not OK" alarm of the transducer fault detection system. In some embodiments, the "Not OK" alarm can be integral with a set point alarm of the system.

In reference to voltage range 400, data characterizing an electrical signal that falls in the second wiring fault case range 450 can indicate that the transducer is operating outside of its operational range 430 due to a wiring fault. Upon a determination by the at least one data processor that the data characterizing an electrical signal is in the second wiring fault case range 450, the data processor can be configured to provide a list of possible fault diagnoses to an operator. In some embodiments, the list of possible fault diagnoses can include a diagnosis that the signal line is shorted to the transducer power. In some embodiments, the list can be provided in a hierarchal list based on probability of occurrence. In some embodiments, the list can be provided to a user interface of a general user interface display communicatively coupled to the at least one data processor.

In some embodiments, the operational range 430 can have a lower limit 425 and an upper limit 435. In some embodiments, the lower limit of the operational range 425 can be equal to, or in between about −0.5 V and −1 V, although other lower limit values can be envisioned. In some embodiments, the upper limit of the operational range 435 can be equal to, or in between about −18 V and −22 V, although other upper limit values can be envisioned. The first wiring fault case range 410 can have a lower limit at the zero point 405, and an upper limit at voltage 415. In some embodiments, voltage 415 can be about −0.25 V. The transducer fault case range 420 can have a lower limit at voltage 415, and an upper limit at the lower limit of the operational range 425. The out of range case range 440 can have a lower limit at the upper limit of the operational range 435, and an upper limit at voltage 445. In some embodiments, voltage 445 can be equal to (the non-zero supply voltage value 455) of about +0.25 V. When the non-zero supply voltage value 455 is equal to −23.5 V, for example, voltage 445 can be equal to about −23.25 V. The second wiring fault case range 450 can have a lower limit at voltage 445, and an upper limit at the non-zero supply voltage value 455. A variety of ranges can be contemplated based on the operational settings associated with each various transducer type and is not restricted to the specific ranges identified above.

In some embodiments, the transducer can be configured to be an accelerometer. In some embodiments, the accelerometer can be any of a micro-electro-mechanical system (MEMS) capacitive accelerometer, a hall-effect accelerometer, a piezoelectric accelerometer, a piezo-resistive accelerometer, or the like. Accelerometers traditionally provide an alternating current (AC) output with an AC baseline at 0 V when they are not moving. It can be desirable to artificially move this AC baseline to a non-zero voltage value in order to be able to differentiate, for example, the case where the accelerometer is not moving from the case where there is no power being provided to the accelerometer. Accordingly, a direct current (DC) bias voltage can be applied to the accelerometer output to move the AC baseline away from 0 V.

In some embodiments, when the transducer is an accelerometer, the transducer fault detection system can be configured to determine a fault case from a first plurality of fault case ranges and/or from a second plurality of fault case ranges. The first plurality of fault case ranges can be within a full-signal voltage range (discussed below in relation to FIG. 5). The full-signal voltage can include both the DC bias voltage portion of the data characterizing an electrical signal as well as an AC portion of the data characterizing an electrical signal. The second plurality of fault case ranges can be within a DC-voltage range (discussed below in relation to FIG. 6). When determining a fault case from the second plurality of fault cases, the data characterizing an electrical signal that is output from the accelerometer can be sent through a filter in order to separate the DC portion of the voltage (bias voltage) from the AC portion. In some embodiments, the filter can be a low-pass filter. After passing the data characterizing an electrical signal through the filter, the DC portion of the voltage can be received into the at least one data processor and compared to the DC-voltage range.

Figure 5:
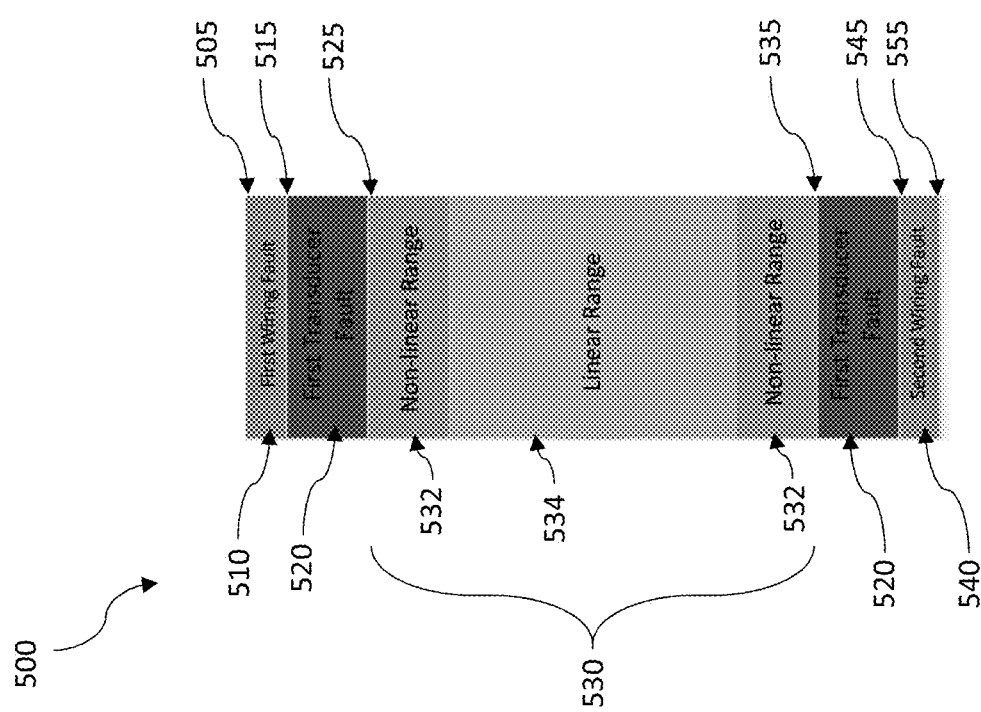
FIG. 5 illustrates an exemplary full-signal voltage range for data characterizing an electrical signal that is output from a transducer into at least one data processor of a computing system of a transducer fault detection system for determining a fault case described herein.

FIG. 5 illustrates an exemplary voltage range 500 representing a full-signal voltage range for data characterizing an electrical signal that is output from a transducer into at least one data processor of a computing system of a transducer fault detection system. In some embodiments, the full-signal voltage range 500 can include a first plurality of fault case voltage ranges, and an operational range for an accelerometer. The full-signal voltage range 500 can span from a zero point 505 to a non-zero supply voltage value 555 supplied to the transducer. In some embodiments, the zero point 505 can be about 0 V, although other lower limit values can be envisioned, and the non-zero supply voltage value 555 can be about −23.5 V, although other upper limit values can be envisioned. In some embodiments, the first plurality of fault case ranges can include a first wiring fault case range 510, a first transducer fault case range 520, and a second wiring fault case range 540. In some embodiments, the operational range 530 can include a non-linear range 532, and a linear range 534 within the non-linear range 534. A variety of ranges can be contemplated based on the operational settings associated with each various transducer type and is not restricted to the specific ranges identified above.

In reference to the full-signal voltage range 500, data characterizing an electrical signal that falls in the first wiring fault case range 510 can indicate that the transducer is operating outside of its operational range 530 due to a wiring fault. Upon a determination by the at least one data processor that the data characterizing an electrical signal is in the first wiring fault case range 510, the data processor can be configured to provide a list of possible fault diagnoses to an operator. In some embodiments, the list of possible fault diagnoses can include a diagnosis that the signal line is shorted to common, a diagnosis that the signal line is disconnected, a diagnosis that the transducer power is not connected to the accelerometer and/or an interface module for the transducer, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor.

In reference to the full-signal voltage range 500, data characterizing an electrical signal that falls in the first transducer fault case range 520 can indicate that the transducer is operating outside of its operational range 530 due to a fault in the transducer. Upon a determination by the at least one data processor that the data characterizing an electrical signal is in the first transducer fault case range 520, the data processor can be configured to provide a list of possible fault diagnoses to an operator. In some embodiments, the list of possible fault diagnoses can include a diagnosis that there has been an impact event in the system being monitored, a diagnosis that there is a fault with the accelerometer, a diagnosis that there is a fault with the interface module of the accelerometer, and/or a diagnosis that there is a fault with the wiring between the accelerometer and the interface module of the accelerometer. In some embodiments, the list can be provided in a hierarchal list based on probability of occurrence. In some embodiments, the list can be provided to a user interface of a general user interface display communicatively coupled to the at least one data processor. In some embodiments, upon a determination that the data characterizing an electrical signal is in the first transducer fault case range 520, the data processor can be configured to initiate a "Not OK" alarm of the transducer fault detection system. In some embodiments, the "Not OK" alarm can be integral with a set point alarm of the system. Further, in some embodiments, upon a determination that the data characterizing an electrical signal is in the first transducer fault case range 520, the data processor can be configured to trip power to the system being monitored by the transducer fault detection system.

In reference the full-signal voltage range 500, data characterizing an electrical signal that falls in the second wiring fault case range 540 can indicate that the transducer is operating outside of its operational range 530 due to a wiring fault. Upon a determination by the at least one data processor that the data characterizing an electrical signal is in the second wiring fault case range 540, the data processor can be configured to provide a list of possible fault diagnoses to an operator. In some embodiments, the list of possible fault diagnoses can include a diagnosis that the signal line is shorted to the transducer power. In some embodiments, the list can be provided in a hierarchal list based on probability of occurrence. In some embodiments, the list can be provided to a user interface of a general user interface display communicatively coupled to the at least one data processor.

In some embodiments, the operational range 530 can have a lower limit 525 and an upper limit 535. In some embodiments, the lower limit of the operational range 525 can be equal to, or in between about −1 V and −2 V, although other lower limit values can be envisioned. In some embodiments, the upper limit of the operational range 535 can be equal to, or in between about −17 V and −20 V, although other upper limit values can be envisioned. The first wiring fault case range 510 can have a lower limit at the zero point 505, and an upper limit at voltage 515. In some embodiments, voltage 515 can be −0.25 V. The first transducer fault case range 520 can have a lower limit at voltage 515, and an upper limit at voltage 545, not including the operational range 530. In some embodiments, voltage 545 can be equal to (the non-zero supply voltage value 555)+about 0.25 V. If the non-zero supply voltage value 555 is equal to −23.5 V, for example, voltage 545 can be equal to −23.25 V. The second wiring fault case range 540 can have a lower limit at voltage 545, and an upper limit at the non-zero supply voltage value 555. A variety of ranges can be contemplated based on the operational settings associated with each various transducer type and is not restricted to the specific ranges identified above.

Figure 6:
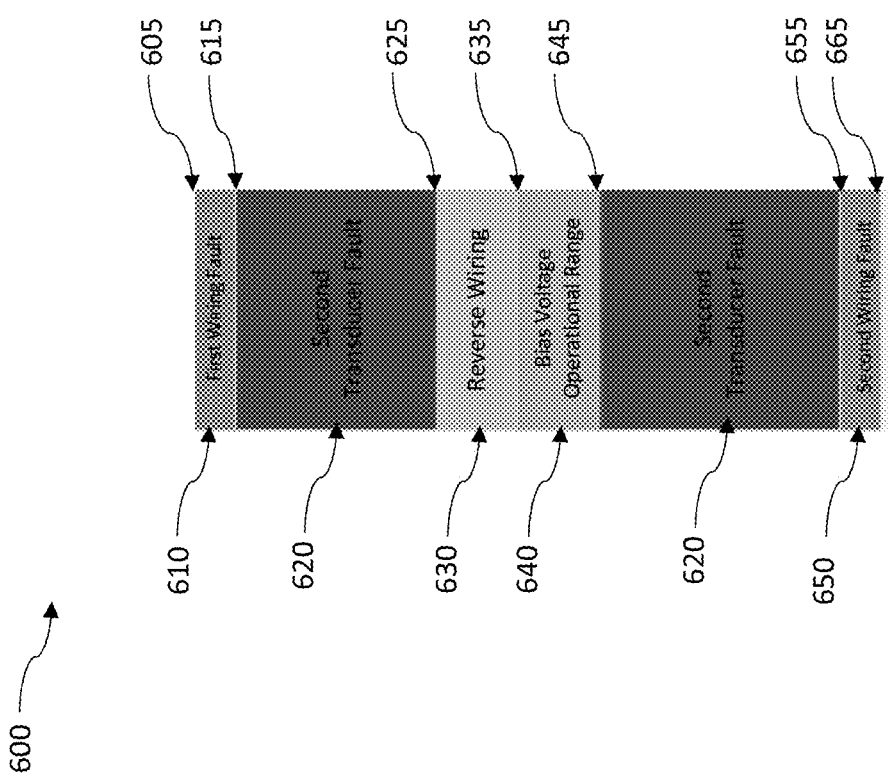
FIG. 6 illustrates an exemplary DC-voltage range derived from the full-signal range of FIG. 5 for determining a fault case described herein.

In some embodiments, determining a fault case(s) from a plurality of fault cases for an accelerometer can further include determining a fault case from a second plurality of fault case ranges within a DC-voltage range 600 illustrated, for example, by FIG. 6. The DC-voltage range 600 can span from a zero point 605 to a non-zero supply voltage value 655 supplied to the transducer. In some embodiments, the zero point 605 can be about 0 V, and the non-zero supply voltage value 655 can be about −23.5 V, although other non-zero supply voltages can be envisioned. In some embodiments, the DC-voltage range can include an operational bias voltage range 640 having a lower limit 635 and an upper limit 645. In some embodiments, the lower limit 635 can be about −8 V, although other lower limit values can be envisioned, and the upper limit 645 can be about −9 V, although other upper limit values can be envisioned. In some embodiments, the second plurality of fault case ranges can include a first wiring fault case range 610, a second transducer fault case range 620, a reverse wiring fault case range 630, and a second wiring fault case range 650. A variety of ranges can be contemplated based on the operational settings associated with each various transducer type and is not restricted to the specific ranges identified above.

In reference to the DC-voltage range 600, a bias voltage that falls in the first wiring fault case range 610 can indicate that the bias voltage is outside of its operational range 640 due to a wiring fault. Upon a determination by the at least one data processor that the bias voltage is in the first wiring fault case range 610, the data processor can be configured to provide a list of possible fault diagnoses to an operator. In some embodiments, the list of possible fault diagnoses can include a diagnosis that a signal line is shorted to common, a diagnosis that the signal line is disconnected, a diagnosis that the transducer power is not connected to the transducer and/or an interface module for the transducer, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor.

In reference to the DC-voltage range 600, a bias voltage that falls in the second transducer fault case range 620 can indicate that the bias voltage is outside of its operational range 640 due to a fault in the transducer. Upon a determination by the at least one data processor that the bias voltage is in the second transducer fault case range 620, the data processor can be configured to provide a list of possible fault diagnoses to an operator. In some embodiments, the list of possible fault diagnoses can include a diagnosis that there has been an impact event in the system being monitored, a diagnosis that there is a fault with the accelerometer, a diagnosis that there is a fault with the interface module of the accelerometer, a diagnosis that there is a fault with the wiring between the accelerometer and the interface module of the accelerometer, and/or a diagnosis that the accelerometer is saturated. In some embodiments, the list can be provided in a hierarchal list based on probability of occurrence. In some embodiments, the list can be provided to a user interface of a general user interface display communicatively coupled to the at least one data processor. In some embodiments, upon a determination that the bias voltage is in the second transducer fault case range 620, the data processor can be configured to initiate a "Not OK" alarm of the transducer fault detection system. In some embodiments, the "Not OK" alarm can be integral with a set point alarm of the system. Further, in some embodiments, upon a determination that the bias voltage is in the second transducer fault case range 620, the data processor can be configured to trip power to the system being monitored by the transducer fault detection system.

In reference the DC-voltage range 600, a bias voltage that falls in the reverse wiring fault case range 630 can indicate that the bias voltage is outside of its operational range 640 due to reverse wiring. In some embodiments, if the transducer's wiring is reversed, the bias voltage of the output signal can be shifted from its operational range 640 to the reverse wiring fault case range 630. Upon a determination by the at least one data processor that the bias voltage is in the reverse wiring fault case range 630, the data processor can be configured to provide a list of possible fault diagnoses to an operator. In some embodiments, the list of possible fault diagnoses can include a diagnosis that the transducer's wiring is reversed, and/or a diagnosis that the transducer is saturated. In some embodiments, the list can be provided in a hierarchal list based on probability of occurrence. In some embodiments, the list can be provided to a user interface of a general user interface display communicatively coupled to the at least one data processor.

In reference to the DC-voltage range 600, a bias voltage that falls in the second wiring fault case range 650 can indicate that the bias voltage is outside of its operational range 640 due to a wiring fault. Upon a determination by the at least one data processor that the bias voltage is in the second wiring fault case range 650, the data processor can be configured to provide a list of possible fault diagnoses to an operator. In some embodiments, the list of possible fault diagnoses can include a diagnosis that the signal line is shorted to the transducer power. In some embodiments, the list can be provided in a hierarchal list based on probability of occurrence. In some embodiments, the list can be provided to a user interface of a general user interface display communicatively coupled to the at least one data processor.

In some embodiments, the operational range 640 can have a lower limit 635 and an upper limit 645. In some embodiments, the lower limit of the operational range 635 can be about −8 V, although other lower limit values can be envisioned. In some embodiments, the upper limit of the operational range 645 can be about −9 V, although other upper limit values can be envisioned. The first wiring fault case range 610 can have a lower limit at the zero point 605, and an upper limit at voltage 615. In some embodiments, voltage 615 can be about −0.25 V, although other voltage values can be envisioned. The second transducer fault case range 620 can have a lower limit at voltage 615, and an upper limit at voltage 655, not including the reverse wiring fault case range 630, or the operational range 640. In some embodiments, voltage 655 can be equal to (the non-zero supply voltage value 655)+about 0.25 V, although other voltage values can be envisioned. If the non-zero supply voltage value 665 is equal to −23.5 V, for example, voltage 655 can be equal to −23.25 V. The reverse wiring fault case range 630 can have a lower limit at voltage 625 and an upper limit at the lower limit of the operational range 635. In some embodiments, voltage 625 can be equal to (the lower limit of the operational range 635)+(the absolute value of the operational range 640). For example, if the lower limit of the operational range 635 is −8 V, and the upper limit of the operational range 645 is −9 V, the voltage 625 can be equal to −7 V. The second wiring fault case range 650 can have a lower limit at voltage 655, and an upper limit at the non-zero supply voltage value 665. A variety of ranges can be contemplated based on the operational settings associated with each various transducer type and is not restricted to the specific ranges identified above.

In some embodiments, the first wiring fault case 510 and the first wiring fault case 610 can be combined into one wiring fault case. Additionally, in some embodiments, the second wiring fault case 540 and the second wiring fault case 650 can be combined into one wiring fault case.

In some embodiments, the transducer can be configured to be a velomitor. In some embodiments, the velomiter can be an accelerometer as discussed above in relation to FIGS. 5-6, with an internal integrator configured to integrate the data characterizing an electrical signal. Velomitors traditionally provide an alternating current (AC) output with an AC baseline at 0 V when they are not moving. It can be desirable to artificially move this AC baseline to a non-zero voltage value in order to be able to differentiate, for example, the case where the velomitor is not moving from the case where there is no power being provided to the velomitor. Accordingly, a direct current (DC) bias voltage can be applied to the velomitor output to move the AC baseline away from 0 V.

In some embodiments, when the transducer is a velomitor, the transducer fault detection system can be configured to determine a fault case from a first plurality of fault case ranges and/or from a second plurality of fault case ranges. The first plurality of fault case ranges can be within a full-signal voltage range (discussed below in relation to FIG. 7). The full-signal voltage can include both the DC bias voltage portion of the data characterizing an electrical signal as well as an AC portion of the data characterizing an electrical signal. The second plurality of fault case ranges can be within a DC-voltage range (discussed below in relation to FIG. 8). When determining a fault case from the second plurality of fault cases, the data characterizing an electrical signal that is output from the velomitor can be sent through a filter in order to separate the DC portion of the voltage (bias voltage) from the AC portion. In some embodiments, the filter can be a low-pass filter. After passing the data characterizing an electrical signal through the filter, the DC portion of the voltage can be received into the at least one data processor and compared to the DC-voltage range.

Figure 7:
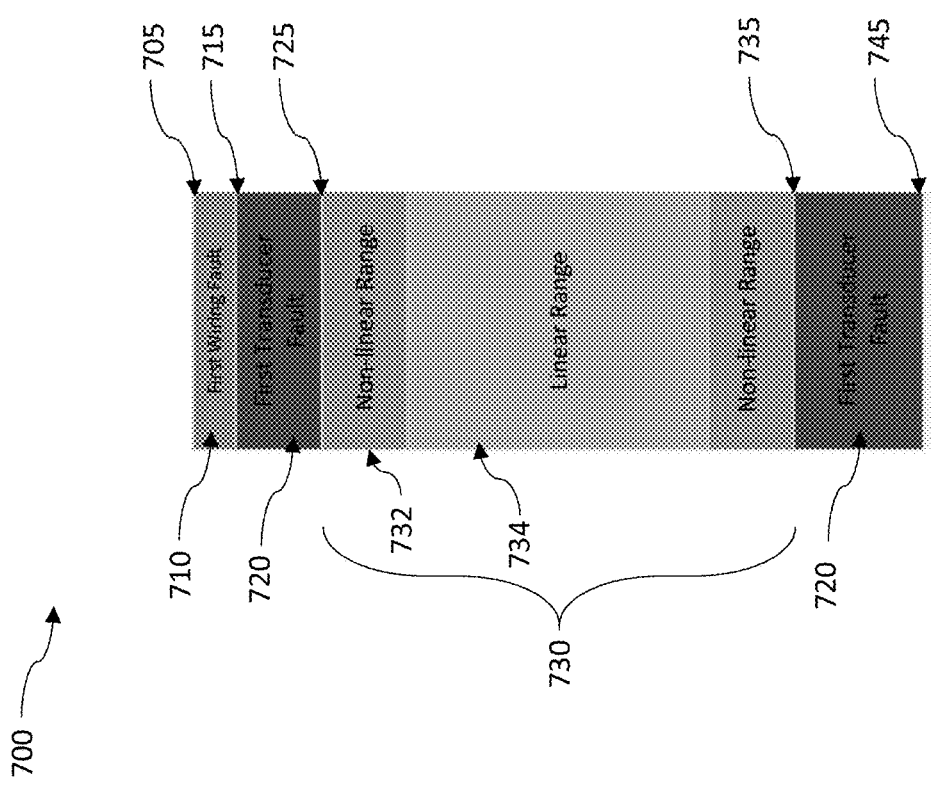
FIG. 7 illustrates another exemplary full-signal voltage range for data characterizing an electrical signal that is output from a transducer into at least one data processor of a computing system of a transducer fault detection system for determining a fault case described herein.

FIG. 7 illustrates an exemplary voltage range 700 representing a full-signal voltage range for data characterizing an electrical signal that is output from a transducer into at least one data processor of a computing system of a transducer fault detection system. In some embodiments, the full-signal voltage range 700 can include a first plurality of fault case voltage ranges, and an operational range for a velomitor. The full-signal voltage range 700 can span from a zero point 705 to a non-zero supply voltage value 745 supplied to the transducer. In some embodiments, the zero point 705 can be about 0 V, and the non-zero supply voltage value 745 can be about −23.5 V, although other non-zero supply voltage values can be envisioned. In some embodiments, the first plurality of fault case ranges can include a first wiring fault case range 710, and a first transducer fault case range 720. In some embodiments, the operational range 730 can include a non-linear range 732, and a linear range 734 within the non-linear range 734. A variety of ranges can be contemplated based on the operational settings associated with each various transducer type and is not restricted to the specific ranges identified above.

In reference to the full-signal voltage range 700, data characterizing an electrical signal that falls in the first wiring fault case range 710 can indicate that the transducer is operating outside of its operational range 730 due to a wiring fault. Upon a determination by the at least one data processor that the data characterizing an electrical signal is in the first wiring fault case range 710, the data processor can be configured to provide a list of possible fault diagnoses to an operator. In some embodiments, the list of possible fault diagnoses can include a diagnosis that the signal line is shorted to common, a diagnosis that the signal line is disconnected, a diagnosis that the velomitor lines shorted together, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor.

In reference to the full-signal voltage range 700, data characterizing an electrical signal that falls in the first transducer fault case range 720 can indicate that the transducer is operating outside of its operational range 730 due to a fault in the transducer. Upon a determination by the at least one data processor that the data characterizing an electrical signal is in the first transducer fault case range 720, the data processor can be configured to provide a list of possible fault diagnoses to an operator. In some embodiments, the list of possible fault diagnoses can include a diagnosis that there has been an impact event in the system being monitored, a diagnosis that there is a fault with the velomitor, a diagnosis that there is a fault with the interface module of the velomitor, and/or a diagnosis that there is a fault with the wiring between the velomitor and the interface module of the velomitor. In some embodiments, the list can be provided in a hierarchal list based on probability of occurrence. In some embodiments, the list can be provided to a user interface of a general user interface display communicatively coupled to the at least one data processor. In some embodiments, upon a determination that the data characterizing an electrical signal is in the first transducer fault case range 720, the data processor can be configured to initiate a "Not OK" alarm of the transducer fault detection system. In some embodiments, the "Not OK" alarm can be integral with a set point alarm of the system. Further, in some embodiments, upon a determination that the data characterizing an electrical signal is in the first transducer fault case range 720, the data processor can be configured to trip power to the system being monitored by the transducer fault detection system.

In some embodiments, the operational range 730 can have a lower limit 725 and an upper limit 735. In some embodiments, the lower limit of the operational range 725 can be about −2 V, although other lower limit values can be envisioned. In some embodiments, the upper limit of the operational range 735 can be equal to, or in between about −20 V and about −23 V, although other upper limit values can be envisioned. The first wiring fault case range 710 can have a lower limit at the zero point 705, and an upper limit at voltage 715. In some embodiments, voltage 715 can be about −0.25 V. The first transducer fault case range 720 can have a lower limit at voltage 715, and an upper limit at voltage 735, not including the operational range 730. In some embodiments, voltage 735 can be equal to (the non-zero supply voltage value 745)+about 0.25 V, although other voltage values can be envisioned. For example, if the non-zero supply voltage value 745 is equal to −23.5 V, voltage 735 can be equal to −23.25 V. A variety of ranges can be contemplated based on the operational settings associated with each various transducer type and is not restricted to the specific ranges identified above.

Figure 8:
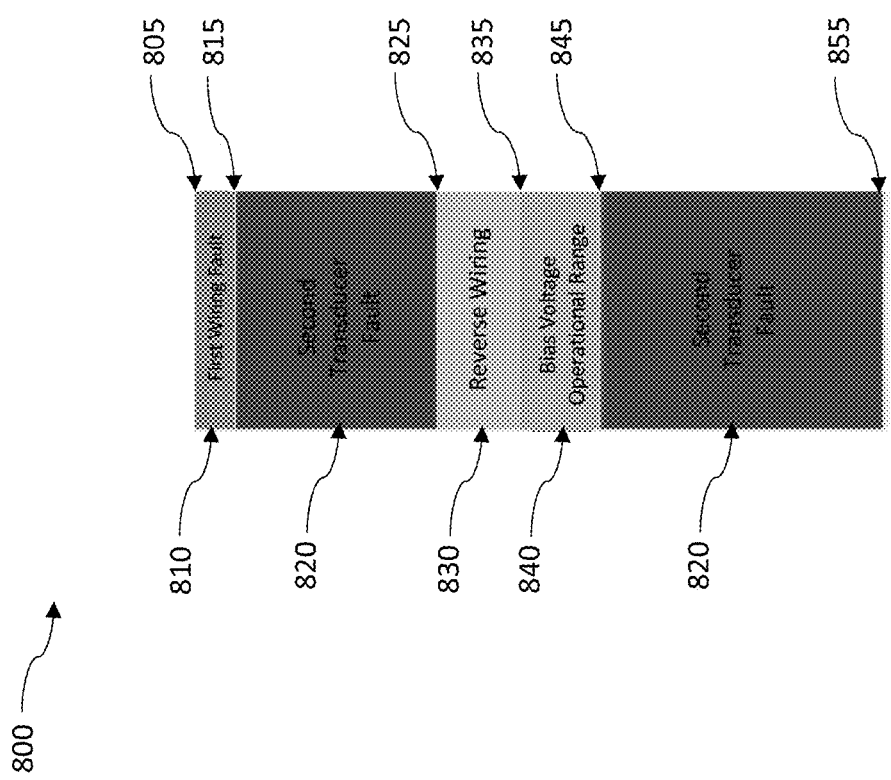
FIG. 8 illustrates an exemplary DC-voltage range derived from the full-signal range of FIG. 7 for determining a fault case described herein.

In some embodiments, determining a fault case(s) from a plurality of fault cases for a velomitor can further include determining a fault case from a second plurality of fault case ranges within a DC-voltage range 800 illustrated, for example, by FIG. 8. The DC-voltage range 800 can span from a zero point 805 to a non-zero supply voltage value 855 supplied to the transducer. In some embodiments, the zero point 805 can be about 0 V, and the non-zero supply voltage value 855 can be about −23.5 V, although other non-zero supply voltage values can be envisioned. In some embodiments, the DC-voltage range can include an operational bias voltage range 840 having a lower limit 835 and an upper limit 845. In some embodiments, the lower limit 835 can be equal to or in between about −9 V and about −11 V, although other lower limit values can be envisioned. The upper limit 845 can be equal to or in between about −13 V and about −15 V, although other upper limit values can be envisioned. In some embodiments, the second plurality of fault case ranges can include a second wiring fault case range 810, a second transducer fault case range 820, and a reverse wiring fault case range 830. A variety of ranges can be contemplated based on the operational settings associated with each various transducer type and is not restricted to the specific ranges identified above.

In reference to the DC-voltage range 800, a bias voltage that falls in the second wiring fault case range 810 can indicate that the bias voltage is reading outside of its operational range 840 due to a wiring fault. Upon a determination by the at least one data processor that the bias voltage is in the first wiring fault case range 810, the data processor can be configured to provide a list of possible fault diagnoses to an operator. In some embodiments, the list of possible fault diagnoses can include a diagnosis that the signal line is shorted to common, a diagnosis that the signal line is disconnected, a diagnosis that the velomitor lines shorted together, and/or a diagnosis that there is a loose connector somewhere in the system. In some embodiments, the list can be provided in a hierarchal list based on probability of occurrence. In some embodiments, the list can be provided to a user interface of a general user interface display communicatively coupled to the at least one data processor.

In reference to the DC-voltage range 800, a bias voltage that falls in the second transducer fault case range 820 can indicate that the bias voltage is outside of its operational range 840 due to a fault in the transducer. Upon a determination by the at least one data processor that the bias voltage is in the second transducer fault case range 820, the data processor can be configured to provide a list of possible fault diagnoses to an operator. In some embodiments, the list of possible fault diagnoses can include a diagnosis that there is a fault with the velomitor, and/or a diagnosis that the velomitor is saturated. In some embodiments, the list can be provided in a hierarchal list based on probability of occurrence. In some embodiments, the list can be provided to a user interface of a general user interface display communicatively coupled to the at least one data processor. In some embodiments, upon a determination that the bias voltage is in the second transducer fault case range 820, the data processor can be configured to initiate a "Not OK" alarm of the transducer fault detection system. In some embodiments, the "Not OK" alarm can be integral with a set point alarm of the system. Further, in some embodiments, upon a determination that the bias voltage is in the second transducer fault case range 820, the data processor can be configured to trip power to the system being monitored by the transducer fault detection system.

In reference the DC-voltage range 800, a bias voltage that falls in the reverse wiring fault case range 830 can indicate that the bias voltage is outside of its operational range 840 due to reverse wiring. In some embodiments, if the transducer's wiring is reversed, the bias voltage of the output signal can be shifted from its operational range 840 to the reverse wiring fault case range 830. Upon a determination by the at least one data processor that the bias voltage is in the reverse wiring fault case range 830, the data processor can be configured to provide a list of possible fault diagnoses to an operator. In some embodiments, the list of possible fault diagnoses can include a diagnosis that the transducer's wiring is reversed, and/or a diagnosis that the transducer is saturated. In some embodiments, the list can be provided in a hierarchal list based on probability of occurrence. In some embodiments, the list can be provided to a user interface of a general user interface display communicatively coupled to the at least one data processor.

In some embodiments, the bias voltage operational range 840 can have a lower limit 835 and an upper limit 845. In some embodiments, the lower limit of the operational range 835 can be equal to or in between about −9 V and about −11 V, although other lower limit values can be envisioned. In some embodiments, the upper limit of the operational range 845 can be equal to or in between about −13 V and about −15 V, although other upper limit values can be envisioned. The second wiring fault case range 810 can have a lower limit at the zero point 805, and an upper limit at voltage 815. In some embodiments, voltage 815 can be about −0.25 V. The second transducer fault case range 820 can have a lower limit at voltage 815, and an upper limit at voltage 855, not including the reverse wiring fault case range 830, or the operational range 840. In some embodiments, voltage 855 can be equal to the non-zero supply voltage value. In some embodiments, the non-zero supply voltage can be equal to about −23.25 V. The reverse wiring fault case range 830 can have a lower limit at voltage 825 and an upper limit at the lower limit of the operational range 835. In some embodiments, voltage 825 can be equal to (the lower limit of the operational range 835)+(the absolute value of the operational range 840). For example, if the lower limit of the operational range 835 is −9 V, and the upper limit of the operational range 845 is −15 V, the voltage 825 can be equal to −3 V. A variety of ranges can be contemplated based on the operational settings associated with each various transducer type and is not restricted to the specific ranges identified above.

In some embodiments, the first wiring fault case 710 and the second wiring fault case 810 can be combined into one wiring fault case.

FIG. 9 illustrates a table 900 showing exemplary transducers 910 and transducer types 920, along with their respective operational ranges 930, linear ranges 940 within the operational ranges 930, and bias voltage operational ranges 950.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable data processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable data processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Data processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "approximately" includes within 1, 2, 3, or 4 standard deviations. In certain embodiments, the term "about" or "approximately" means within 50%, 20%, 15%, %, 9%, 8%, 7%, 6%, 5%, 4%, 3%, 2%, 1%, 0.5%, or 0.05% of a given value or range. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising: receiving, by at least one data processor of a computing system communicatively coupled to a transducer, data characterizing an electrical signal generated by the transducer; determining, by the at least one data processor, that the received data is outside of a predetermined operational range of the transducer, the operational range having a lower limit and an upper limit; determining, by the at least one data processor, a period of time the received data remains outside of the operational range and comparing the period of time to a predetermined fault time delay; determining, by the at least one data processor, that the period of time the received data remains outside of the operational range is greater than or equal to the predetermined fault time delay; determining, by the at least one data processor, that the received data is invalid responsive to determining that the period of time is greater than or equal to the predetermined fault time delay; determining, by the at least one data processor, a fault case from a plurality of fault cases based on the invalid received data; and providing, by the at least one data processor, the determined fault case.

2. The method of claim 1 further comprising:
determining, by the at least one data processor, that the received data has returned within the operational range of the transducer;
determining, by the at least one data processor, a period of time the received data remains inside of the operational range to compare to a predetermined settling time;
determining, by the at least one data processor, that the period of time the received data remains inside of the operational range is greater than or equal to the predetermined settling time; and
determining, by the at least one data processor, that the received data is valid.

3. The method of claim 1, wherein the received data is a voltage.

4. The method of claim 3, wherein the transducer is a radial proximity sensor, the plurality of fault cases comprise at least two of a first wiring fault case, a transducer fault case, an out of range fault case, and a second wiring fault case, the determining of the fault case further comprising:
assigning the first wiring fault case responsive to the voltage being in a first voltage range outside the operational range;
assigning the transducer fault case responsive to the voltage being in a second voltage range outside the operational range;
assigning the out of range fault case responsive to the voltage being in a third voltage range outside the operational range; and
assigning the second wiring fault case responsive to the voltage being in a fourth voltage range outside the operational range.

5. The method of claim 3, wherein the transducer is a thrust proximity sensor, the plurality of fault cases comprise at least two of a first wiring fault case, a transducer fault case, an out of range fault case, and a second wiring fault case, the determining of the fault case further comprising:
assigning the first wiring fault case responsive to the voltage being in a first voltage range outside the operational range;
assigning the transducer fault case responsive to the voltage being in a second voltage range outside the operational range, assigning the transducer fault case further comprising
alarming, by an alarm communicatively coupled to the at least one data processor;
assigning the out of range fault case responsive to the voltage being in a third voltage range outside the operational range, assigning the out of range fault case further comprising
alarming, by the alarm communicatively coupled to the at least one data processor; and
assigning the second wiring fault case responsive to the voltage being in a fourth voltage range outside the operational range.

6. The method of claim 1, wherein the received data is a voltage ranging from 0 V to a non-zero supply voltage supplied to the transducer, the voltage further including a direct current (DC) bias voltage portion and an alternating current (AC) voltage portion, and the transducer further including a DC bias voltage operational range, including a lower limit and an upper limit.

7. The method of claim 6, wherein the transducer is an accelerometer and the plurality of fault cases comprise at least two of a first wiring fault case, a first transducer fault case, and a second wiring fault case, the determining of the fault case further comprising:

assigning the first wiring fault case responsive to the voltage being in a first voltage range outside the operational range;
assigning the first transducer fault case responsive to the voltage being in a second voltage range outside the operational range; and
assigning the second wiring fault case responsive to the voltage being in a third voltage range outside the operational range.

8. The method of claim 7, wherein the plurality of fault cases further comprise one or more of a second transducer fault case, and a reversed wiring case, the determining of the fault case further comprising:
filtering the data received, by the at least one data processor, through a filter configured to separate the DC bias voltage portion from the AC voltage portion;
assigning the first wiring fault case responsive to the DC bias voltage portion being in the first voltage range;
assigning the second transducer fault case responsive to the DC bias voltage portion being in a fourth voltage range outside the DC bias voltage operational range, assigning the second transducer fault case further comprising
alarming, by an alarm communicatively coupled to the at least one data processor;
assigning the reversed wiring case responsive to the DC bias voltage portion being in a fifth voltage range outside the DC bias voltage operational range; and
assigning the second wiring fault case responsive to the DC bias voltage portion being in the third voltage range.

9. The method of claim 8, wherein the transducer is monitoring an operating machine, the method further comprising: turning off power to the operating machine responsive assigning the first wiring fault case and/or the second wiring fault case.

10. The method of claim 6, wherein the transducer is a velocity sensor or an accelerometer coupled to an integrator configured to integrate the data received and the plurality of fault cases comprise a wiring fault case, and a first transducer fault case, the determining of the fault case further comprising:
assigning the wiring fault case responsive to the voltage being in a first voltage range outside the operational range; and
assigning the first transducer fault case responsive to the voltage being in a second voltage range outside the operational range.

11. The method of claim 10, wherein the plurality of fault cases further comprise one or more of a second transducer fault case, and a reversed wiring case, the determining of the fault case further comprising:
filtering the data received, by the at least one data processor, through a filter configured to separate the DC bias voltage portion from the AC voltage portion;
assigning the first wiring fault case responsive to the DC bias voltage portion being in the first voltage range;
assigning the second transducer fault case responsive to the DC bias voltage portion being in a third voltage range outside the DC bias voltage operational range, assigning the second transducer fault case further comprising
alarming, by an alarm communicatively coupled to the at least one data processor; and
assigning the reversed wiring case responsive to the DC bias voltage portion being in a fourth voltage range outside the DC bias voltage operational range.

12. The method of claim 1 wherein the predetermined fault time delay is between 10 and 500 µsec.

13. The method of claim 1, wherein providing is done via a multi-colored LED, a user interface display, and/or an auditory notification coupled to the computing system.

14. The method of claim 1, further comprising:
providing a user with a list of possible faults corresponding to the fault case assigned.

15. A transducer fault detection system comprising:
a transducer configured to acquire physical data from an asset and convert the physical data into a voltage corresponding to the physical data; and
a computing system including at least one data processor communicatively coupled to the transducer, the at least one data processor configured to execute the steps of:
receiving the voltage from the transducer;
determining that the voltage is outside of a predetermined operational range of the transducer, the operational range having a lower limit voltage and an upper limit voltage;
determining a first period of time the voltage remains outside of the operational range;
comparing the first period of time to a predetermined fault time;
responsive to the first period of time being greater than or equal to the predetermined fault time, determining that the voltage is invalid;
responsive to determining that the voltage is invalid, assigning a fault case from a plurality of fault cases based on the voltage; and
providing the assigned fault case.

16. The transducer fault detection system of claim 15, wherein the transducer is chosen from any one of a radial proximity sensor, a thrust proximity sensor, an accelerometer, and a velocity sensor, and the voltage ranges from 0 V to a non-zero supply voltage supplied to the transducer, the voltage further comprising a direct current (DC) bias voltage portion and an alternating current (AC) voltage portion, the transducer fault detection system further comprising a low-pass filter, coupled to the computing system, and configured to separate the DC bias voltage portion from the AC voltage portion.

17. The transducer fault detection system of claim 15, wherein the at least one data processor is further configured to execute the steps of:
determining, that the voltage has returned within the operational range of the transducer;
determining, a second period of time that the voltage remains inside of the operational range;
comparing the second period of time to a predetermined settling time; and
responsive to the second period of time being greater than or equal to the predetermined settling time, determining that the voltage is valid.

18. The transducer fault detection system of claim 15, wherein the at least one data processor is further configured to execute the steps of:
turning off a power to the asset responsive assigning the fault case.

19. The transducer fault detection system of claim 15, further comprising:
an alarm communicatively coupled to the at least one data processor, wherein the at least one data processor is further configured activate the alarm responsive assigning the fault case.

20. The transducer fault detection system of claim 15, further comprising:

a user interface display communicatively coupled to the at least one data processor, wherein the at least one data processor is further configured to provide the assigned fault case to the user interface display with a list of possible faults corresponding to the assigned fault case.

* * * * *